Dec. 1, 1970          R. W. MEIHAK          3,543,608
                    BELT DRIVEN DIFFERENTIAL

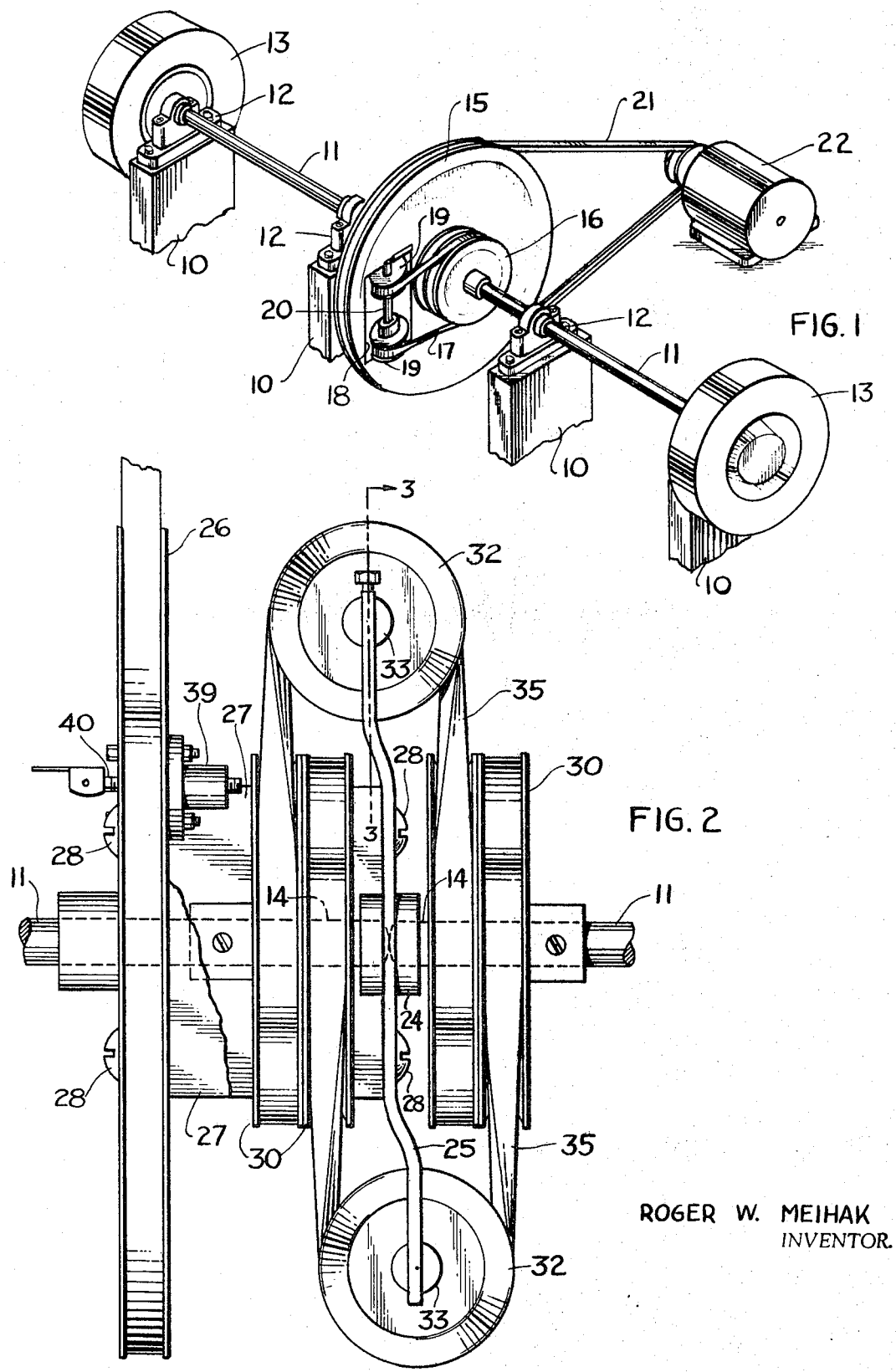

Filed Dec. 6, 1968                          2 Sheets-Sheet 2

ROGER W. MEIHAK
*INVENTOR.*

United States Patent Office 3,543,608
Patented Dec. 1, 1970

3,543,608
BELT DRIVEN DIFFERENTIAL
Roger W. Meihak, 1877 W. Minnehaha,
St. Paul, Minn. 55104
Filed Dec. 6, 1968, Ser. No. 781,918
Int. Cl. F16h 1/28, 1/38, 1/44
U.S. Cl. 74—710.5      4 Claims

ABSTRACT OF THE DISCLOSURE

A belt driven differential having V-belt connection between a driven pulley and a pair of differential pulleys connected to the wheels or the like to be driven at a differential rate. Idler pulleys on the driven pulley means allow the differential movement. Locking means to lock the differential in case of a breakage of belts, and clutch means, useful in prevention of skidding may also be provided.

---

This invention pertains to differential drives for wheels or the like, and more particularly to a differential driven by belts and particularly adaptable to small wheel-driven devices similar to riding lawn mowers, golf carts and similar machines.

In recent years, many small wheel-driven units have become popular. Golf carts, riding lawn mowers, small garden tractors, "go-carts" and many other devices having small gasoline engines or occasionally electrically powered are now sold in great numbers. Most of these devices are propelled through wheels contacting the ground, and most have four wheels.

The drive of such devices is usually either through a single, off-center wheel, or through two wheels connected to a solid axle. In the first case, the single wheel provides an off center drive so that the steering is effected and the wear on the tire of that wheel is increased. In the second case, there must be slippage of one of two wheels on turning corners or the like so that tire wear is increased.

The use of a differential mechanism is strongly indicated. However, the usual type of differential such as used in an automobile and having a ring gear and set of pinions and the like is far too expensive for the ordinary small unit. Therefore it is desirable to provide a mechanism which will accomplish the same end result with a less expensive and somewhat smaller unit.

By my invention I provide a light weight and inexpensive differential. The drives is by means of V-belts over idler pulleys and is quite efficient. Various refinements are possible as will be seen.

A more complete understanding of my invention in its embodiments may be had from a study of the following specification and the figures, in which:

FIG. 1 is a pictorial view of my device in its simplest form,

FIG. 2 is an edge view of a balanced differential having a manual lock, and with a part of one support broken away to show underlying parts.

Figure 3:
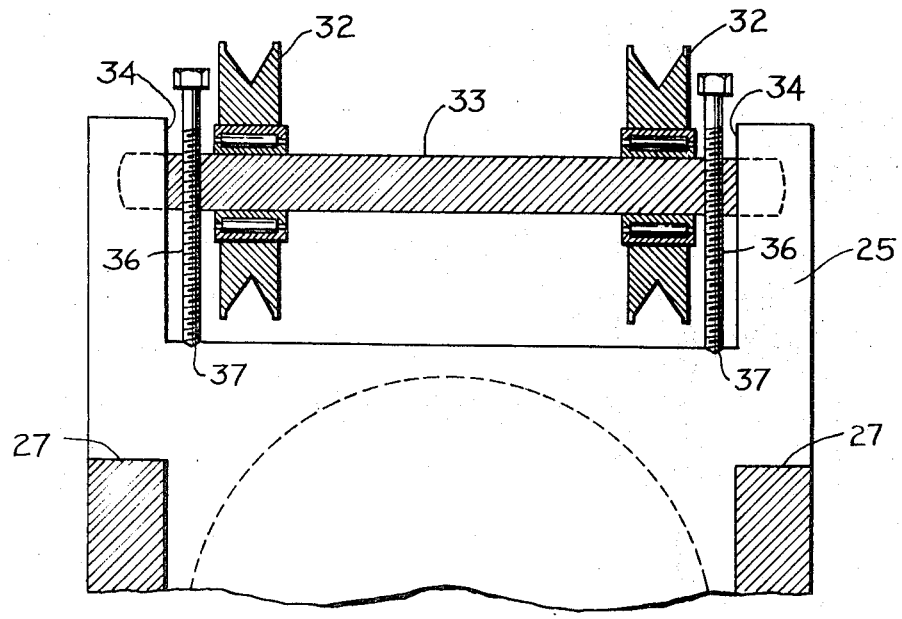
FIG. 3 is an elevational view to an enlarged scale of the idlers on their carrier.

Briefly my invention comprises a differential mechanism useful in smaller wheeled devices. The differential includes a master pulley driven by the motive power. the axles are journalled in the master pulley and each has a drive pulley. Belt means extend around the drive pulleys and over idlers on the master pulley to provide for the differential speeds of the axles.

More specifically, and referring to the drawings, I illustrate the simplest embodiment my device as set on test blocks 10 (FIG. 1). Separate axles 11 are journalled in bearings 12 on the blocks and carry dummy wheels 13. On each axle, at least one bearing should be capable of sustaining a thrust load outwardly so that the axles will not slide outwardly from the center.

The ends 14 of the axles 11 are journalled in the hub of a central or master pulley 15 in the simplest form. The mode of journalling these axles is best seen in FIG. 2, although in this embodiment the location of the ends is not in the pulley. Thus, each axle is free to rotate at its own speed, completely independently of the other except for the differential means.

Adjacent the hub of the master pulley 15, and fixed to the end of each axle, I provide a drive pulley 16 adapted to receive an internal belt 17. The belt 17 extends from one drive pulley to the other through an opening 18 in the master pulley 15. Idler pulleys 19 are journalled on a shaft 20 within the opening 18 to guide the belt.

For purpose of illustration, I have shown the differential as driven by a main belt 21 from a motor 22. It will be obvious that any type of motive power could be substituted for the motor 22, and that a drive by chain or the like could be substituted for the belt drive.

In order to provide balance, it may be necessary to use a device more as illustrated in FIG. 2. In this device, the same axles 11 are used. These axles are journalled in bearings much as before and carry wheels in the same manner. The ends 14 are journalled in a hub 24 of a central plate 25. The plate 25 is fixed to and driven by the main pulley 26 by means of block supports 27. These supports may be fastened to the pulley 26 and the plate 25 by screws 28 or any other convenient fastener.

Dual pulleys 30 each having a pair of grooves so that each can take two belts, are fastened to the axles 11 in the same manner as the single pulleys 16 are fixed to the axles in the first embodiment. The pulley 30 between the main pulley 26 and the plate 25 is disposed between the supports 27 so that it can rotate freely in that space to drive its particular axle.

Figure 4:
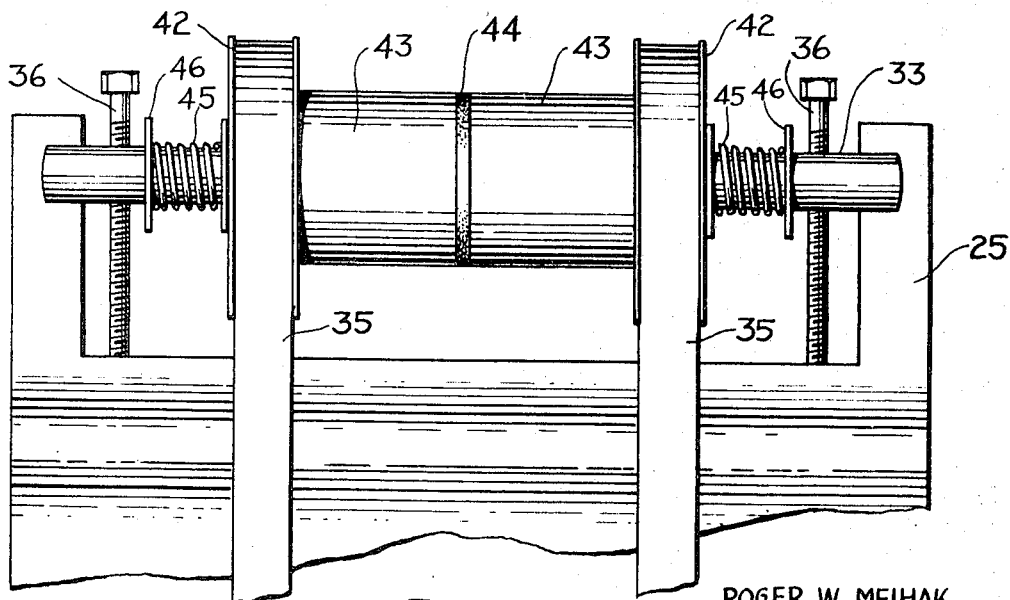
FIG. 4 is a view similar to FIG. 3 showing an alternate type of idler.

The idler pulleys 32 in this embodiment are journalled on axles 33. These axles have a diameter substantially greater than the thickness of the plate 25, and are formed to provide slots at each end of the axle to slidably embrace the plate at its edges 34. These edges 34 (FIGS. 3 and 4) define a cut-out in the ends of the plate in which the idlers 32 are free to rotate. Adjustment means to adjust the radial location of the idlers 32 and therefore the tension of the drive belts 35 is provided by using screws 36 threaded into the axle 33 near its ends. These screws may have pointed ends 37 extending into sockets in the plate 25 to assure proper alignment. It will be obvious that turning the screws 34 will cause the axle 33 to be slidably moved relative to the plate 25 and will therefore adjust the tension in the belt 35 with which the idlers 32 are associated.

Emergency locking means to lock the differential action and to provide driving to at least one wheel may also be provided as illustrated in FIG. 2. A boss 39 is fixed to the main pulley 25. A clamping screw 40 is threadably engaged in said boss in position so that it can be pressed tightly against the nearest drive pulley 30, thus locking the main pulley to the drive pulley to drive one wheel. It is also envisioned that a spring loaded pin could be used instead of a screw. Then a release of the spring could cause spring action to press a pin similar to the screw 40 against the pulley 30 to lock it. This function might be useful in the event of a broken belt. It will be obvious that a depression or hole in the adjacent pulley 30 could be provided into which the screw 40 or the alternative pin could extend to provide a more positive lock.

In some installations, it may be desirable to inhibit the free running of the differential so that there will be less skidding of one wheel relative to the other. In this type of installation, I propose to use the device illustrated in FIG. 4. This device is in all respects similar to the others except for the idlers. The idler pulleys 42 in this device are not only rotatably but also slidably journalled on the axle 33. Each idler carries a drum 43 extending toward the other but separated by a washer 44 of friction material. Compression springs 45 engaged between fixed washers 46 and the pulley 42 cause the pulleys to be urged together and therefore to be frictionally engaged at the washer. To that extent, the action of the differential is inhibited. Thus, unless both axles are quite positively driven at differential speeds—which would be the situation on turning a corner on firm footing—the differential would not operate, but both axles would be driven at the same speed. Thus skidding of one wheel while driving the other would be inhibited and there would be a more positive drive.

It will thus be seen that I have provided a belt driven differential having varied uses, particularly in lighter applications. Several variations are possible to refine the operation of the differential.

I claim:

1. A differential comprising master wheel means, a pair of drive pulleys each attached to an axle to be driven, each of said drive pulleys being formed with grooves to receive two belts, plate means on said master wheel means, two pairs of idler pulleys journalled on an axle on said plate means, said drive pulleys being located on opposite sides of said plate means, said idler pulleys being located so that one pair is diametrically opposed to the second pair across said drive pulleys, and separate belt means running over each pair of idler pulleys and one groove in each of said drive pulleys so that each belt operates independently of the other.

2. The device of claim 1 in which said idler pulleys are journalled on an axle, said axle having divided ends embracing parts of said plate and being slidable relative thereto, screw means threadably engaged in said axle and having an end engaging said plate whereby said belt means may be tightened.

3. The device of claim 1 in which pressure means is carried on said master wheel means, said pressure means being adjustable to contact at least one of said drive pulleys, said contact being strong enough to provide a releasable driving engagement between said master wheel and said drive pulley.

4. The device of claim 2 in which said idler pulleys are formed with drum means extending toward each other on said axle, friction means engageable between said drum means, said idler pulleys being slidable longitudinally of said axle, and spring means on said axle arranged to press said drum means together against said friction means whereby relative rotation between said idler pulley is inhibited.

References Cited

UNITED STATES PATENTS

| 1,028,009 | 5/1912 | Fancher | 74—710 |
| 1,202,395 | 10/1916 | Ledeboer | 74—710 |

FOREIGN PATENTS

| 766,355 | 1/1957 | Great Britain. |
| 932,227 | 10/1955 | Germany. |

CARLTON R. CROYLE, Primary Examiner

J. J. VRABLIK, Assistant Examiner

U.S. Cl. X.R.

74—722, 217